(12) United States Patent
Dane

(10) Patent No.: US 11,167,821 B2
(45) Date of Patent: Nov. 9, 2021

(54) UNDERWATER APPENDAGE ASSEMBLY

(71) Applicant: Solar Sailor Pty Ltd, Middle Cove (AU)

(72) Inventor: Robert Dane, Middle Cove (AU)

(73) Assignee: SOLAR SAILOR PTY LTD, New South Wales (AU)

( * ) Notice: Subject to any disclaimer, the term of this patent is extended or adjusted under 35 U.S.C. 154(b) by 398 days.

(21) Appl. No.: 16/314,053

(22) PCT Filed: Jun. 29, 2017

(86) PCT No.: PCT/AU2017/050672
§ 371 (c)(1),
(2) Date: Dec. 28, 2018

(87) PCT Pub. No.: WO2018/000042
PCT Pub. Date: Jan. 4, 2018

(65) Prior Publication Data
US 2021/0155320 A1    May 27, 2021

(30) Foreign Application Priority Data
Jun. 29, 2016   (AU) ................................ 2016902543

(51) Int. Cl.
*B63B 1/24*      (2020.01)
*B63B 1/04*      (2006.01)
(Continued)

(52) U.S. Cl.
CPC ................ *B63B 1/248* (2013.01); *B63B 1/04* (2013.01); *B63B 1/242* (2013.01); *B63B 1/246* (2013.01); *B63H 1/37* (2013.01); *B63H 19/02* (2013.01)

(58) Field of Classification Search
CPC .. B63B 1/00; B63B 1/04; B63B 1/242; B63B 1/246; B63B 1/248; B63H 1/00;
(Continued)

(56) References Cited

U.S. PATENT DOCUMENTS

| 3,453,981 A | 7/1969 | Gause |
| 3,515,089 A | 6/1970 | Taggart |

(Continued)

FOREIGN PATENT DOCUMENTS

| WO | 1994/010029 A1 | 5/1994 |
| WO | 2007/087197 | 8/2007 |

OTHER PUBLICATIONS

Written Opinion of the International Searching Authority in corresponding application No. PCT/AU2017/050672 dated Sep. 4, 2017.
(Continued)

*Primary Examiner* — Lars A Olson
(74) *Attorney, Agent, or Firm* — Weber Rosselli & Cannon LLP

(57) ABSTRACT

The present invention is directed broadly to an underwater appendage assembly (10) of a marine vessel (12). The underwater appendage assembly (10) is in the form of a rudder assembly fitted to a bow section (14) of the vessel (12). The rudder assembly comprises an appendage in the form of a rudder foil (18) connected to a flapper member (20). The flapper member (20) is arranged whereby movement and more particularly pitching, of the vessel (12) induces deflection of the flapper member (20) relative to the rudder foil (18). This deflection in the flapper member (20) provides an oscillating movement of the flapper member (20) in a flapping action which is substantially synchronised with movement of the vessel (12) upward and downward. The flapping action of the flapper member (20) is effective in promoting forward propulsion of the vessel (12).

18 Claims, 17 Drawing Sheets

(51) Int. Cl.
*B63H 1/37* (2006.01)
*B63H 19/02* (2006.01)

(58) Field of Classification Search
CPC . B63H 1/30; B63H 1/37; B63H 19/00; B63H 19/02; B63H 1/36; F03B 13/18; F03B 13/181
USPC .......................... 114/162, 280; 440/9, 14, 15
See application file for complete search history.

(56) References Cited

U.S. PATENT DOCUMENTS

| | | | |
|---|---|---|---|
| 4,332,571 A * | 6/1982 | Jakobsen | B63H 19/02 440/9 |
| 7,371,136 B2 * | 5/2008 | Hine | B63H 19/02 440/9 |

OTHER PUBLICATIONS

Notification of Transmittal of International Preliminary Report on Patentability in corresponding application No. PCT/AU2017/050672 dated May 18, 2018 and the response to the International Search Report and Written Opinion filed by Applicant on Apr. 12, 2018. 18 pages.

* cited by examiner

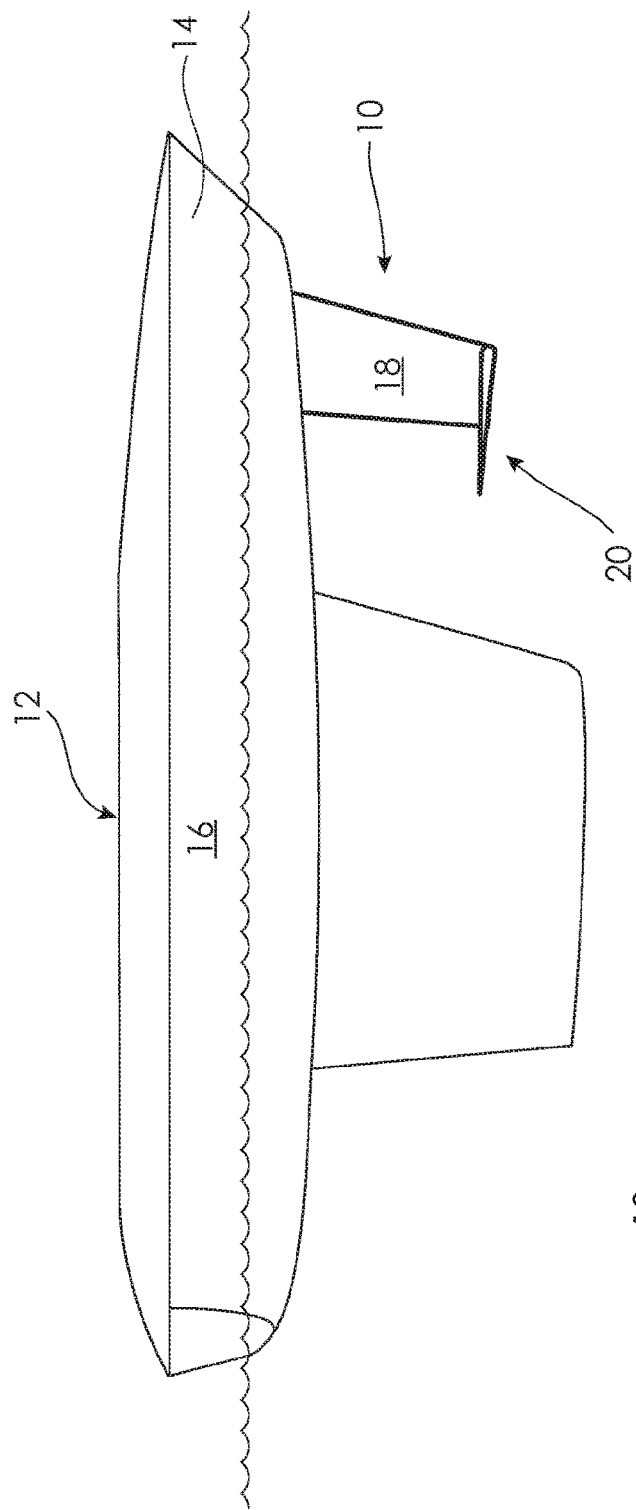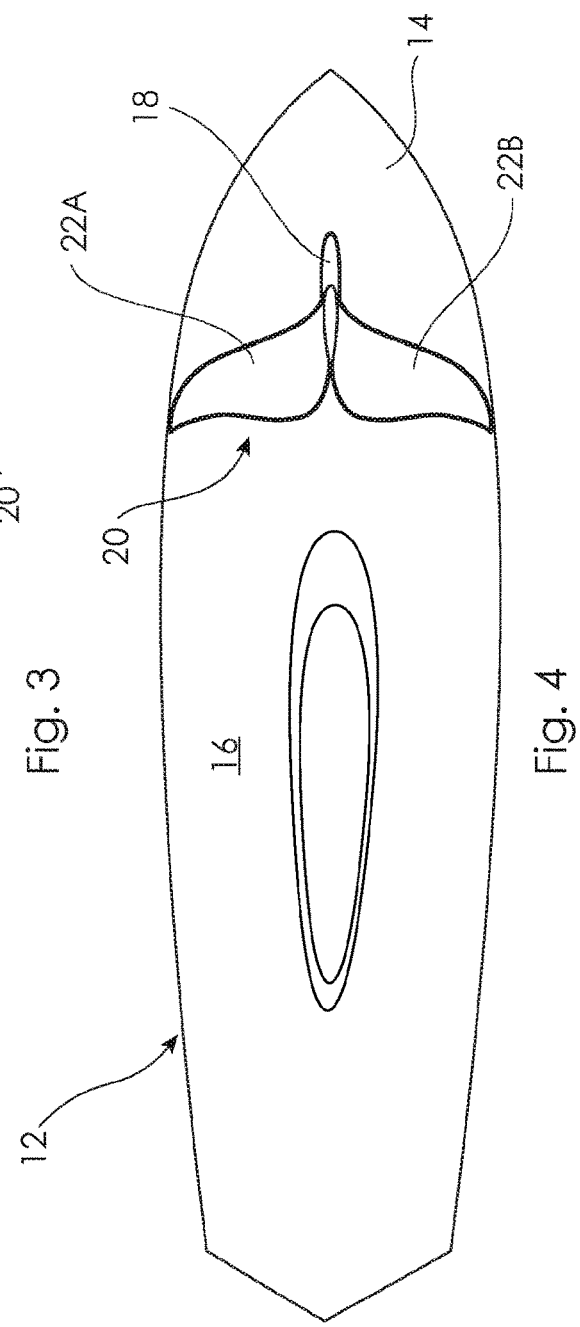

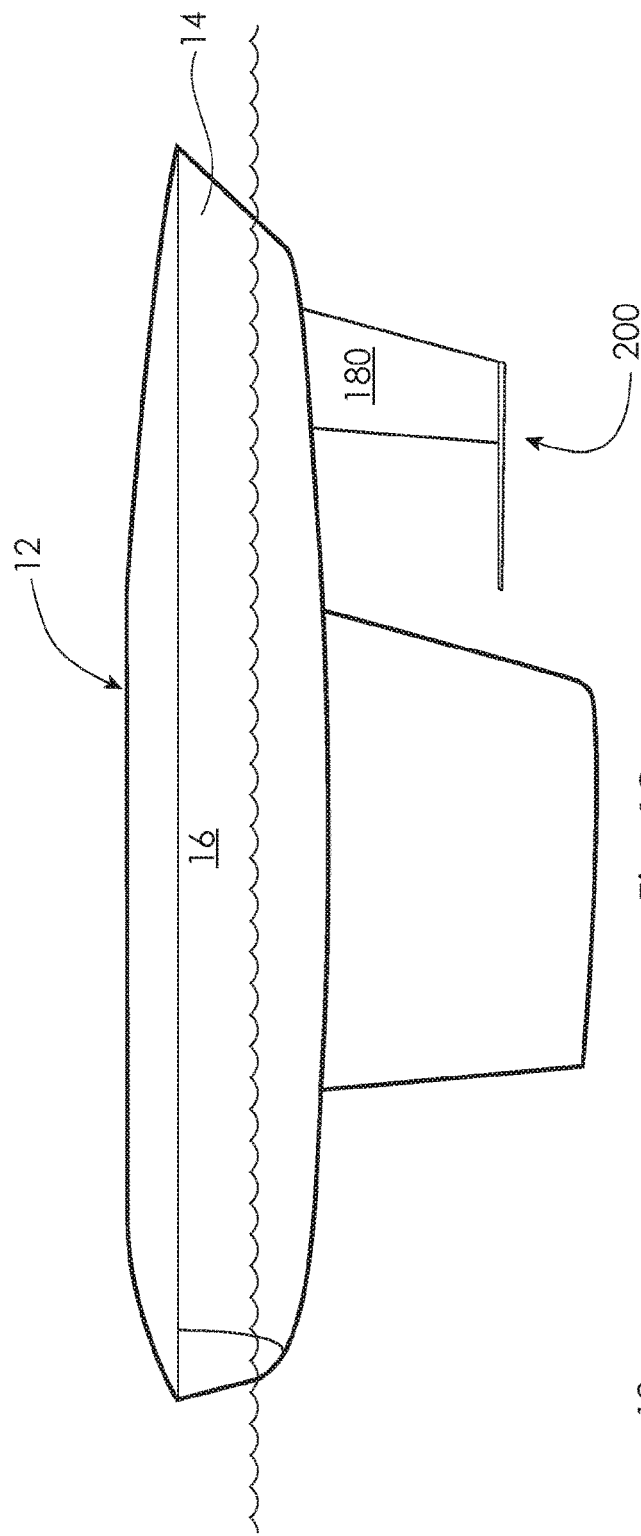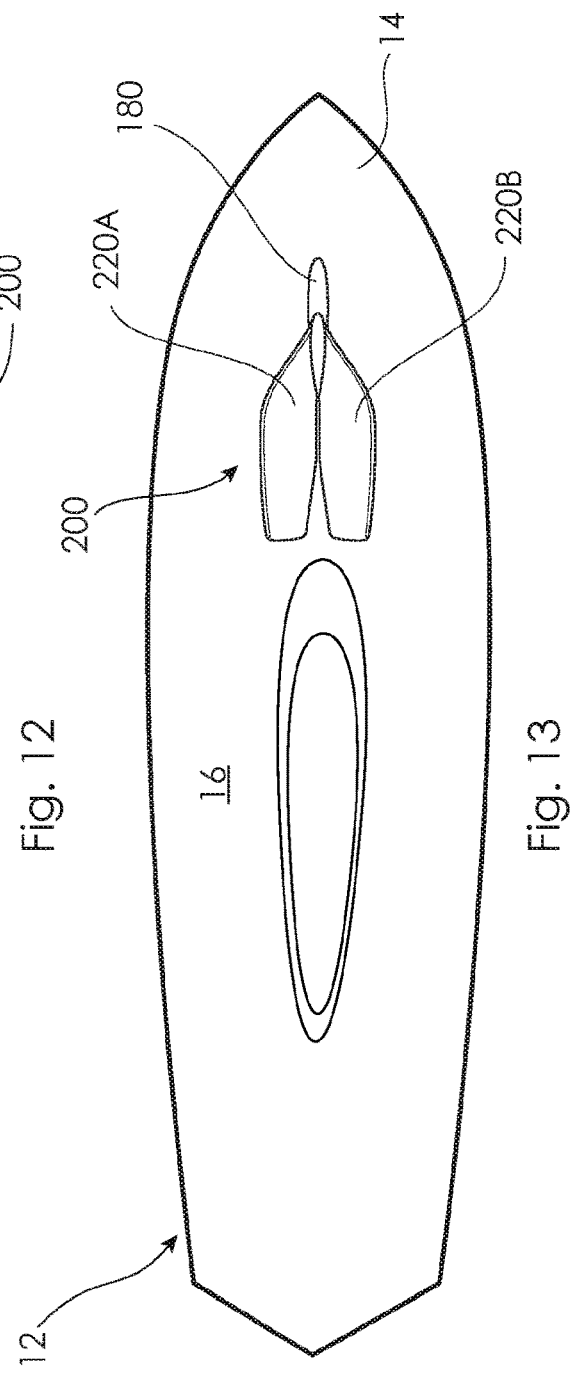

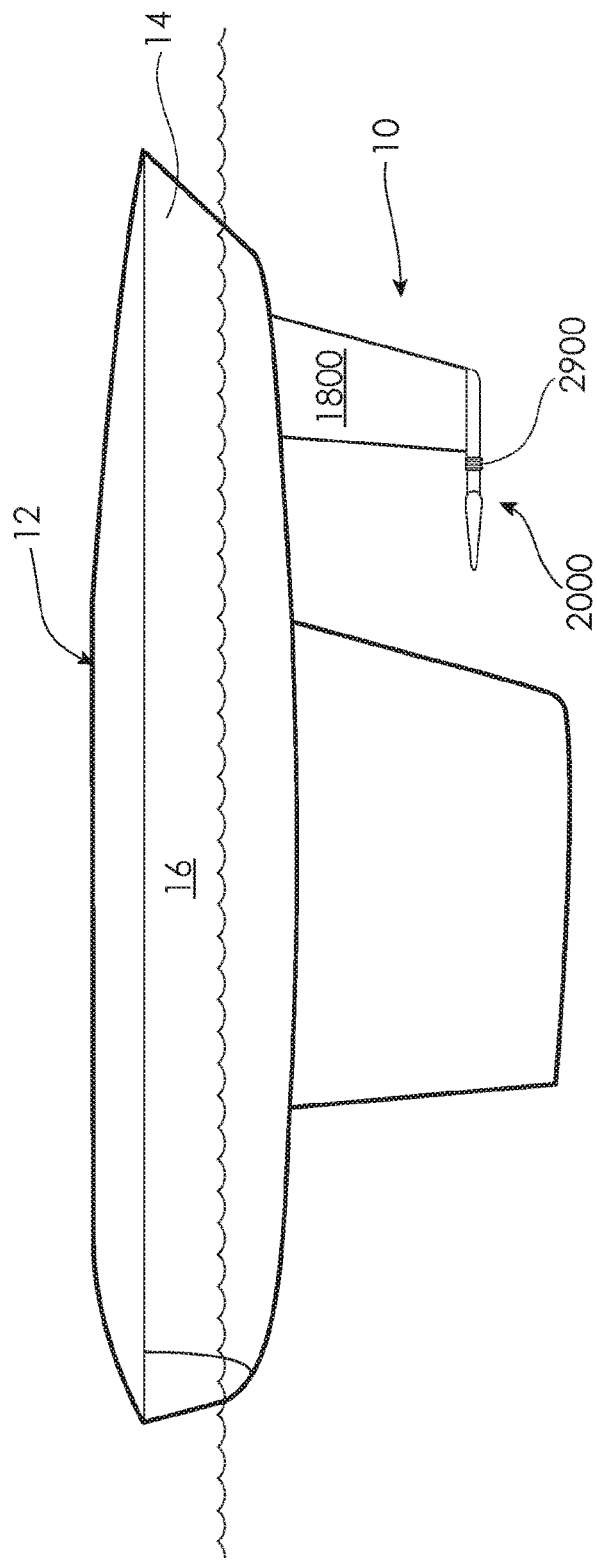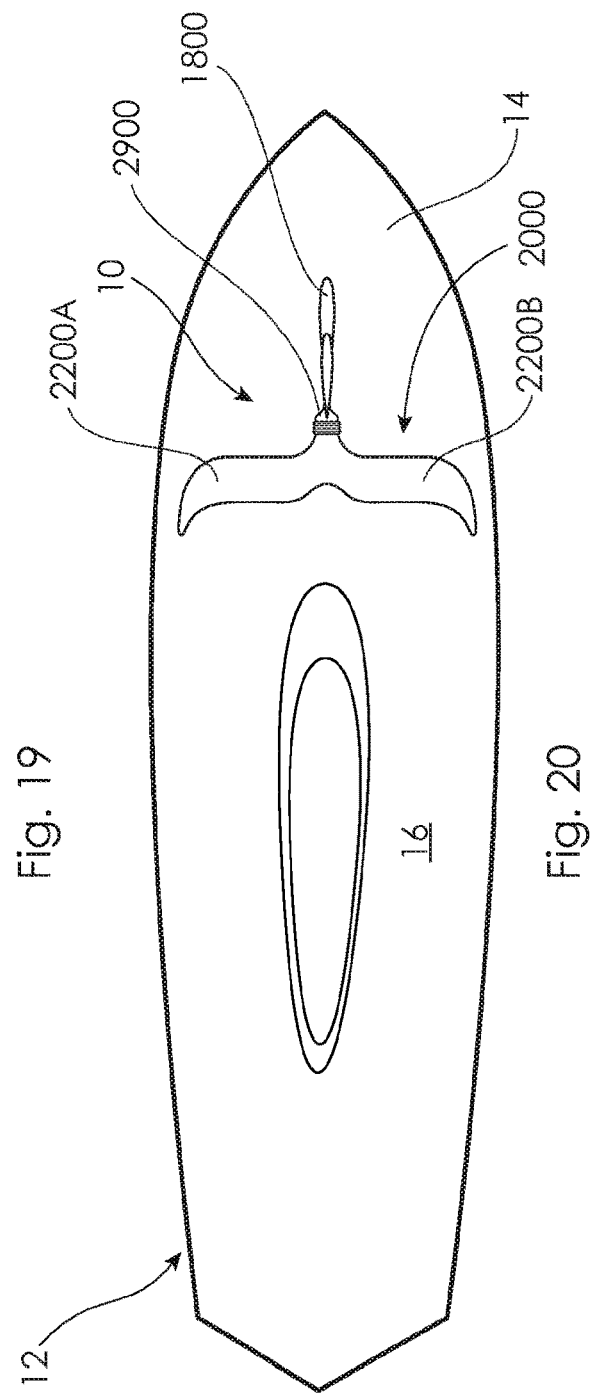

UNDERWATER APPENDAGE ASSEMBLY

TECHNICAL FIELD

The present invention relates broadly to an underwater appendage assembly of a marine vessel and relates particularly, although not exclusively, to a rudder assembly of a sailing vessel.

BACKGROUND OF INVENTION

Utilizing waves to propel a vessel is an idea that stems from over two centuries ago. It is known that whalers throughout historical documents cut off the flukes of whales they had killed, as it was observed that a whale carcass propelled itself at a speed of about 1 knot due to the action of the waves (Bose and Lien, 1990). Vrooman in 1858 patented a vibrating propeller, see U.S. 22,097. Vrooman described a vessel with a series of elastic propelling fins or wings attached to different parts of the hull. This arrangement of fins or wings assisted in propelling the vessel on its course due to the up and down motion of the rolling seas. Linden in 1895 patented connection of a flexible plate in the form of a fin to a fixed arm extending from the transom of a vessel, see GB 14,630. The fin is dispersed in a horizontal plane and flexed up and down by the motion of the waves to propel the vessel forward.

Recently wave harnessing oscillator foils have garnered attention in unmanned surface vessels. Firstly, in a vessel called Waveglider, the 'heave' (linear vertical up/down motion) of surface waves relative to the deeper still water is used to drive underwater foils to create forward propulsion. Secondly, in a vessel called Autonaut both the bow and stern have spring loaded foils which propel the vessel utilizing the 'pitching' of the vessel. In both these prior art arrangements the foils are flat plates and solid.

SUMMARY OF INVENTION

According to the present invention there is provided an underwater appendage assembly of a marine vessel, said assembly comprising:

an underwater appendage adapted to mount to a hull of the marine vessel proximal the bow of said vessel, said appendage being a rudder foil mounted to the hull about a rotational axis; and a flapper member connected to the rudder foil in a substantially horizontal plane substantially perpendicular to the rudder foil, the flapper member arranged whereby movement of the marine vessel induces a deflection of the flapper member relative to the rudder foil in a flapping action effective in promoting forward propulsion of the marine vessel.

Preferably the flapper member is at least in part constructed of a resiliently flexible material whereby pitching of the vessel effects the deflection of the resiliently flexible part of the flapper member.

Preferably the flapper member is in the form of a pair of fins connected to and disposed either side of the appendage, respectively. More preferably the pair of fins are in profile generally wing-shaped and integrally mounted to the appendage, the wing-shaped fins in cross-section generally parallel to the plane of the appendage being tapered in thickness. Even more preferably the pair of fins are tapered in a rearward direction along the parallel cross-section.

Alternatively or preferably the wing-shaped pair of fins are also in cross-section generally transverse or diagonal to the plane of the appendage tapered in thickness. More preferably the pair of fins are tapered in an inward direction along the transverse or diagonal cross-section. Still more preferably the pair of fins define an intermediate space between at least part of their respective trailing edges and rearward of the appendage, the intermediate space designed to promote additional forward propulsion of the vessel.

Preferably the pair of fins each include an elongate rib along at least part of their outer edges. More preferably the elongate rib is in the form of a wing tip.

Preferably the flapper member includes a flexible coupling connected to a rigid or semi-rigid flapper blade, the flexible coupling secured rigidly to the appendage and designed to be deflected to provide the flapping action predominantly in the flapper blade. More preferably the flexible coupling is formed integral with the flapper blade.

Alternatively the flapper member is one of a plurality of flapper members spaced vertically along the appendage. In this embodiment a lowermost of the vertically spaced flapper members mounts at an end of the appendage to assist in providing an endplate effect.

Preferably the flapper member is moulded in one piece. Alternatively the flapper member is one of a plurality of flapper members at least partly secured to one another in a layered configuration.

BRIEF DESCRIPTION OF DRAWINGS

In order to achieve a better understanding of the nature of the present invention preferred embodiments of an underwater appendage assembly of a marine vessel will now be described, by way of example only, with reference to the accompany drawings in which:

FIG. 3 is a side elevation of the marine vessel including the underwater appendage assembly of the first embodiment;

FIG. 4 is an underneath plan view of the marine vessel including the underwater appendage assembly of the first embodiment;

FIG. 12 is a side elevation of the marine vessel including the underwater appendage assembly of the second embodiment;

FIG. 13 is an underneath plan view of the marine vessel including the underwater appendage assembly of the second embodiment;

FIG. 19 is a side elevation of the underwater appendage assembly of the third embodiment fitted to a marine vessel;

FIG. 20 is an underneath plan view of the marine vessel including the underwater appendage assembly of the third embodiment;

DETAILED DESCRIPTION

Figure 1:
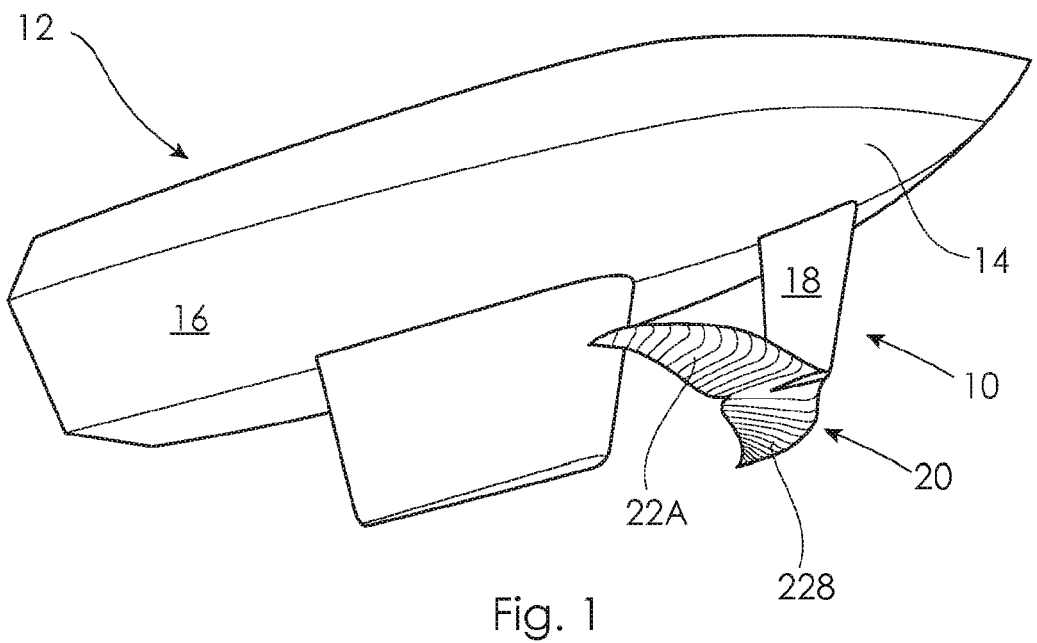
FIG. 1 is an underneath perspective view of a marine vessel including an appendage according to a first embodiment of the present invention.
Figure 2:
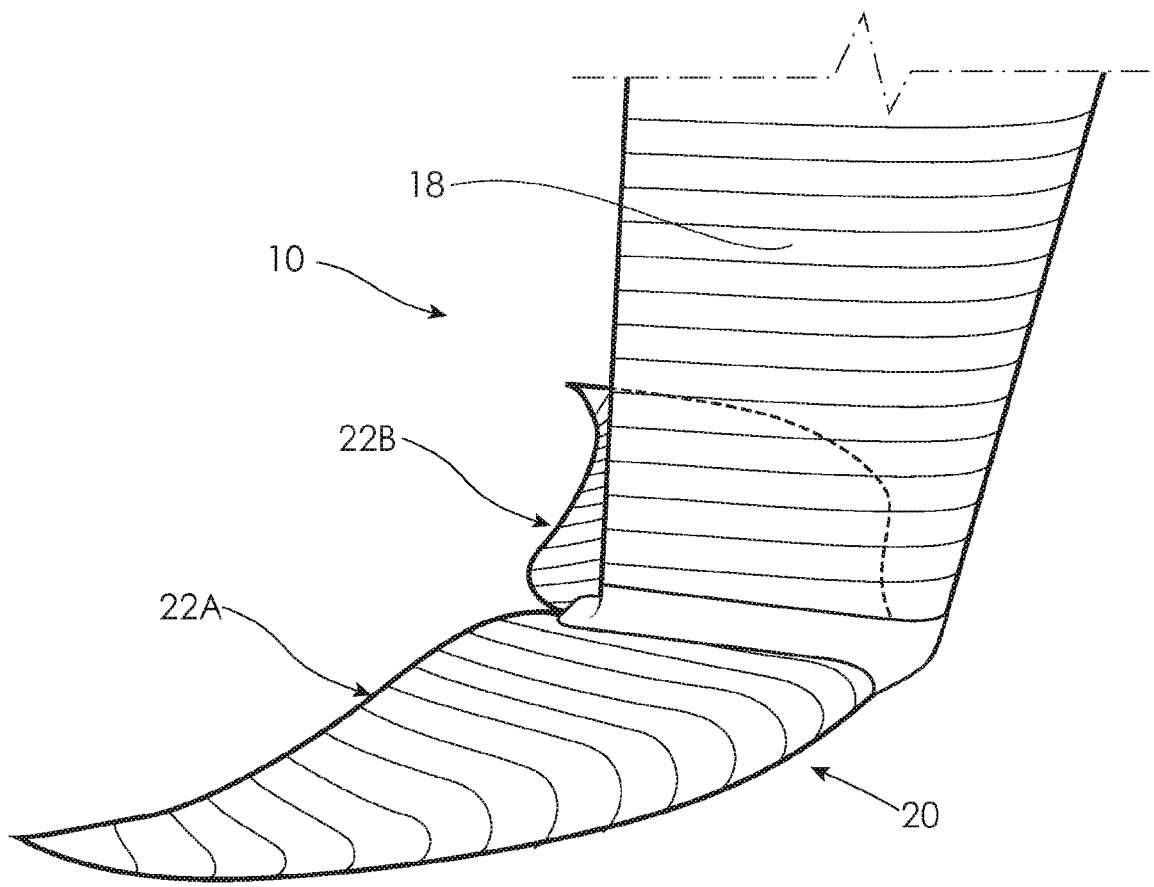
FIG. 2 is an upper perspective view of the underwater appendage assembly of the first embodiment.
Figure 5:
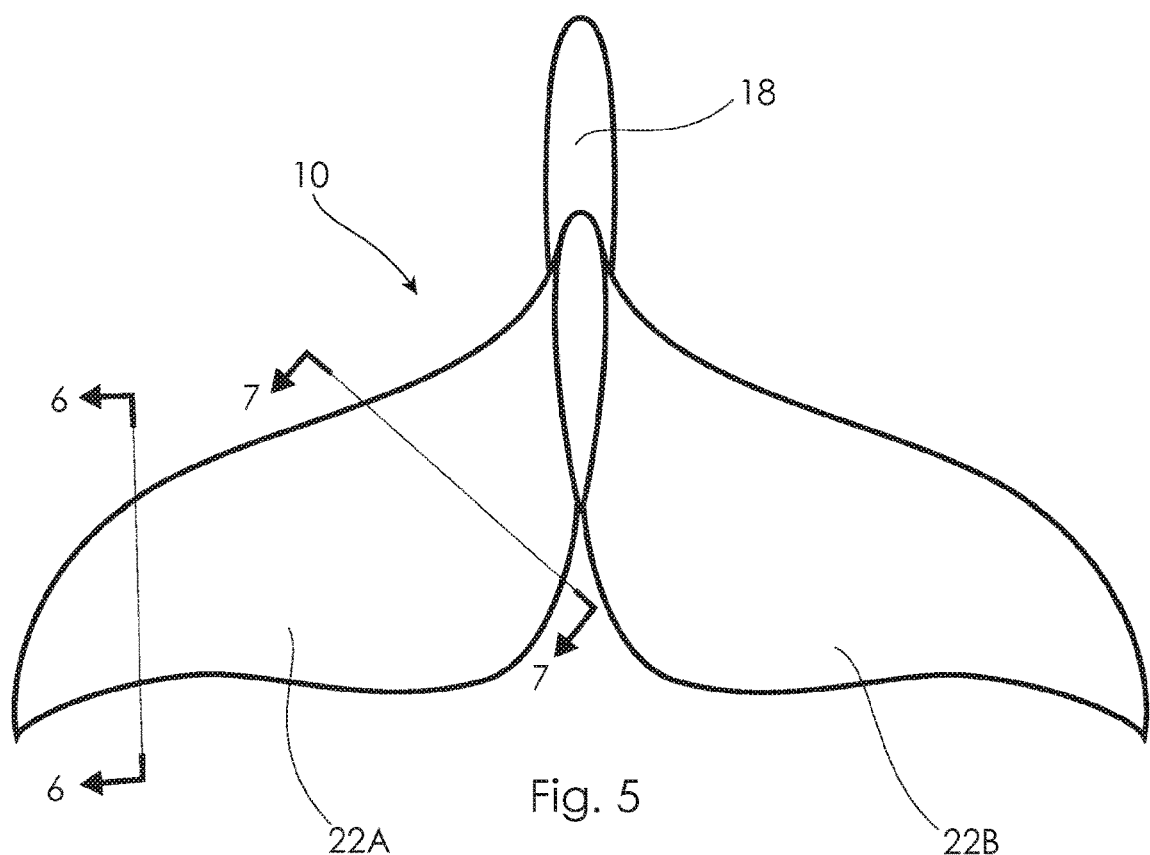
FIG. 5 is an underneath plan view of the underwater appendage assembly of the first embodiment.

As shown in FIG. 1 there is a first embodiment of an underwater appendage assembly 10 of a marine vessel 12 in the form of a sailing vessel or yacht. The underwater appendage assembly 10 is in this embodiment in the form of a rudder assembly fitted to a bow section 14 of a hull 16 of the yacht 12. The bow rudder assembly 10 is in a conventional manner rotationally mounted to the hull 16 about a rudder shaft (not shown) for steerage of the yacht 12.

The rudder assembly 10 comprises an appendage in the form of a rudder foil 18 connected to a flapper member 20. The flapper member 20 is arranged whereby movement, and more particularly pitching, of the yacht 12 induces deflection of the flapper member 20 relative to the rudder foil 18. This deflection in the flapper member 20 provides an oscillating movement of said flapper member 20 in a flapping action which is substantially synchronised with movement of the yacht 12 upward and downward. The flapping action of the flapper member 20 is effective in promoting forward propulsion of the yacht 12.

The rudder assembly 10 of the first embodiment as shown in FIGS. 1 to 9 includes the flapper member 20 in the form of a pair of fins 22A and 22B. The pair of fins 22A/B are wing-shaped resembling a whale's tail mounted integral with and disposed symmetrically either side of the rudder foil 18. The rudder foil 18 is aligned in a substantially vertical orientation with the hull 16 and the pair of fins 22A/B extend in a substantially horizontal plane perpendicular to the rudder foil 18. In this embodiment the pair of fins 22A/B extend from and are formed integral or continuous with the base of the rudder foil 18 substantially along its chord length.

Figures 6, 7:
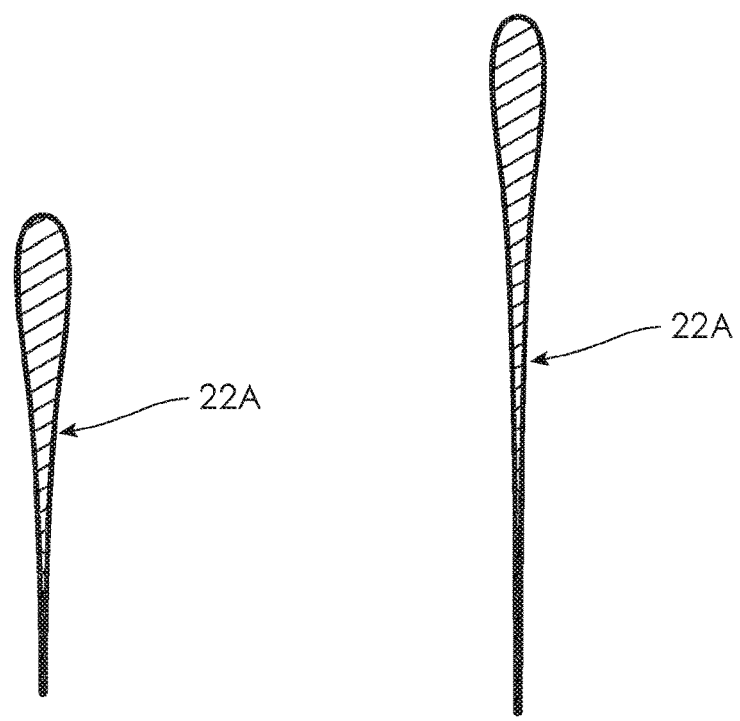
FIGS. 6 and 7 are sectional views of part of the underwater appendage assembly of the first embodiment taken from FIG. 5.

In the first embodiment the pair of fins 22A/B are as best shown in FIGS. 6 and 7 of an aerofoil-type sectional shape. The cross-section of FIG. 6 is taken generally parallel to the plane of the rudder foil 18. The pair of fins 22A/B are tapered in a rearward direction along this parallel cross-section designated as 6-6. As shown in FIG. 7 the pair of fins 22A/B are also tapered in thickness in a cross-section taken generally transverse or diagonal to the plane of the rudder foil 18. The pair of fins 22A/B are tapered in an inward direction along this transverse or diagonal cross-section designated as 7-7. This tapered configuration of the pair of fins 22A/B provides increased deflection both rearward and inward of the flapper member 20.

Figure 8:
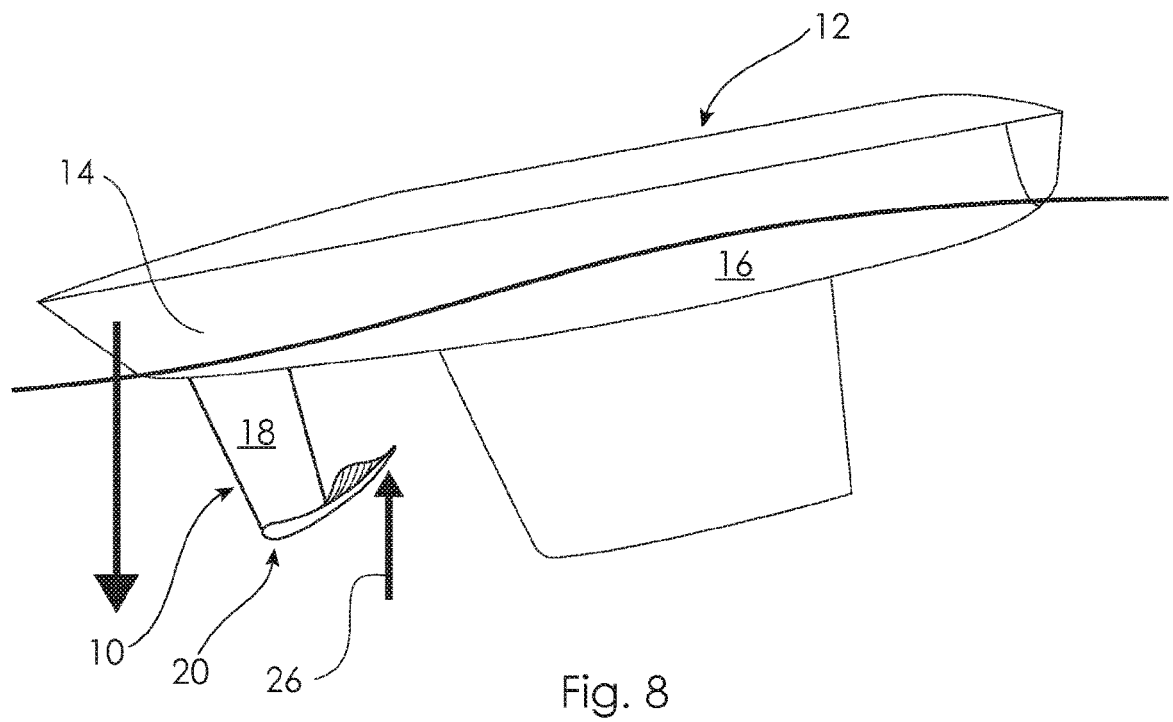
FIGS. 8 and 9 are schematic illustrations shown in elevation of the marine vessel including the underwater appendage assembly of the first embodiment pitching under the influence of waves.
Figure 9:
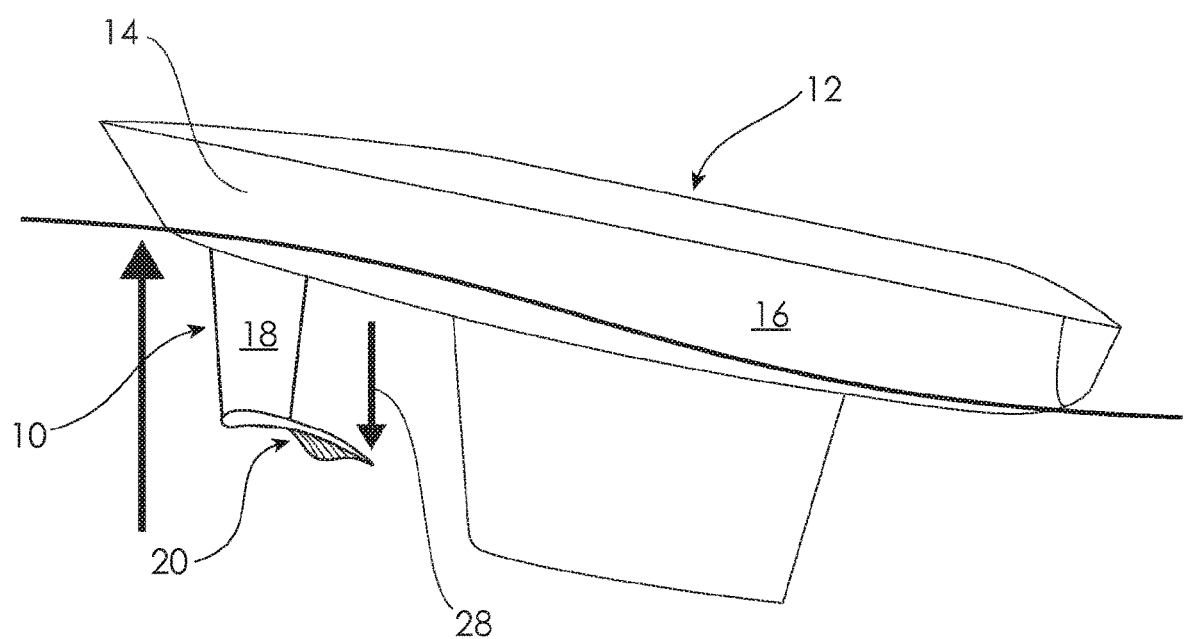
Figure 10:
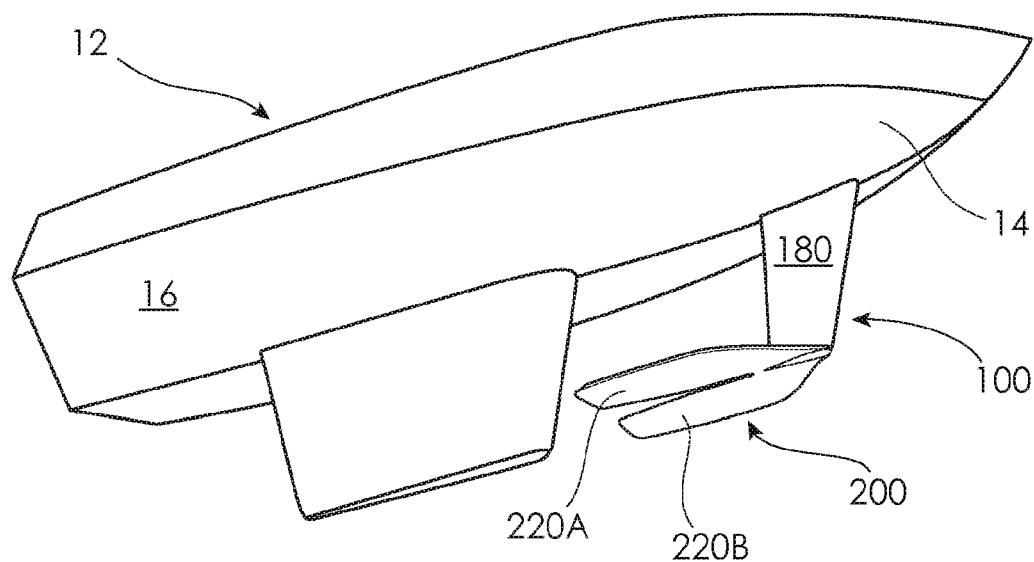
FIG. 10 is an underneath perspective view of a marine vessel including an underwater appendage assembly according to a second embodiment of the invention.
Figure 11:
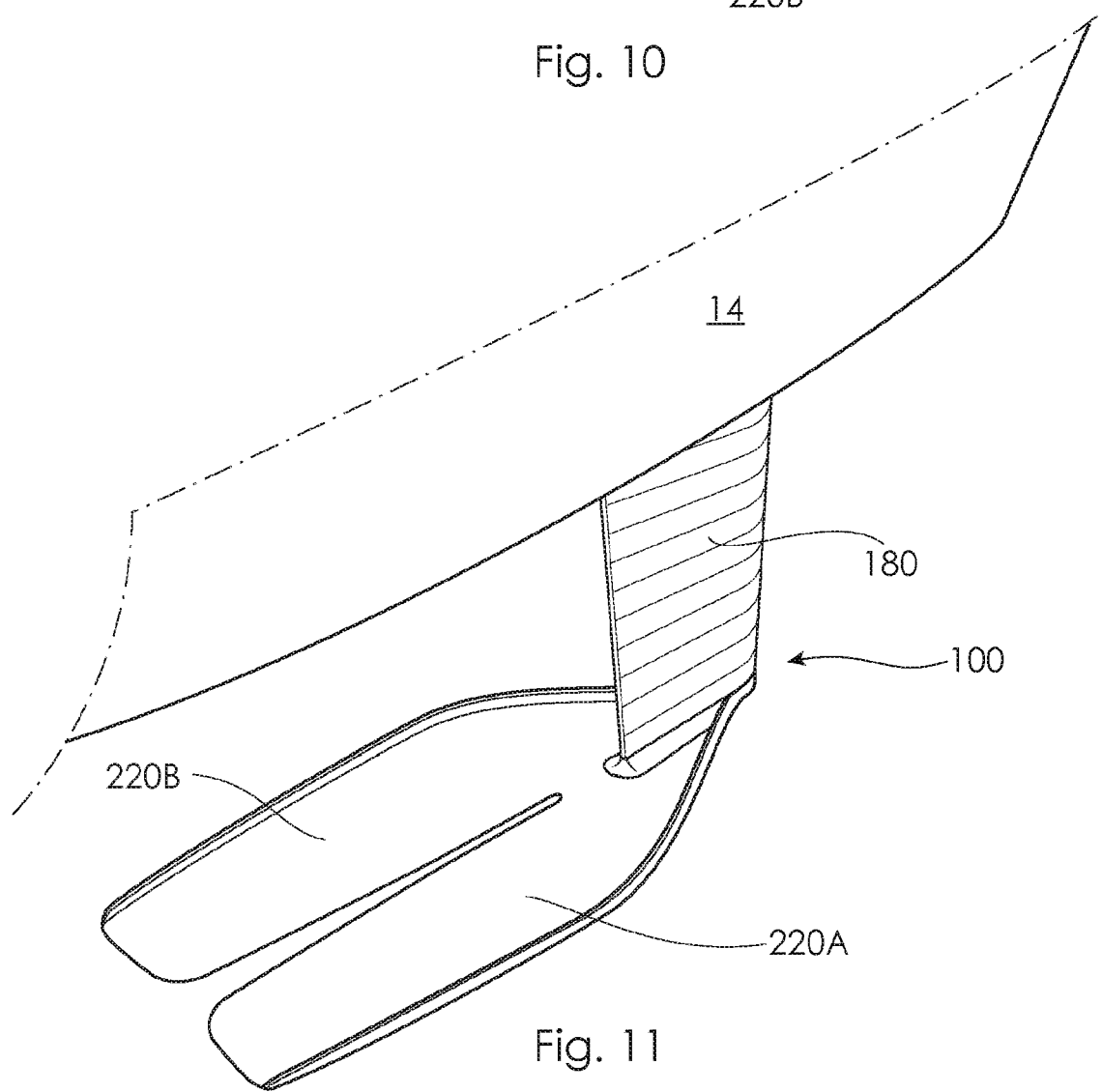
FIG. 11 is an upper perspective view of the underwater appendage assembly of the second embodiment of FIG. 10.
Figure 14:
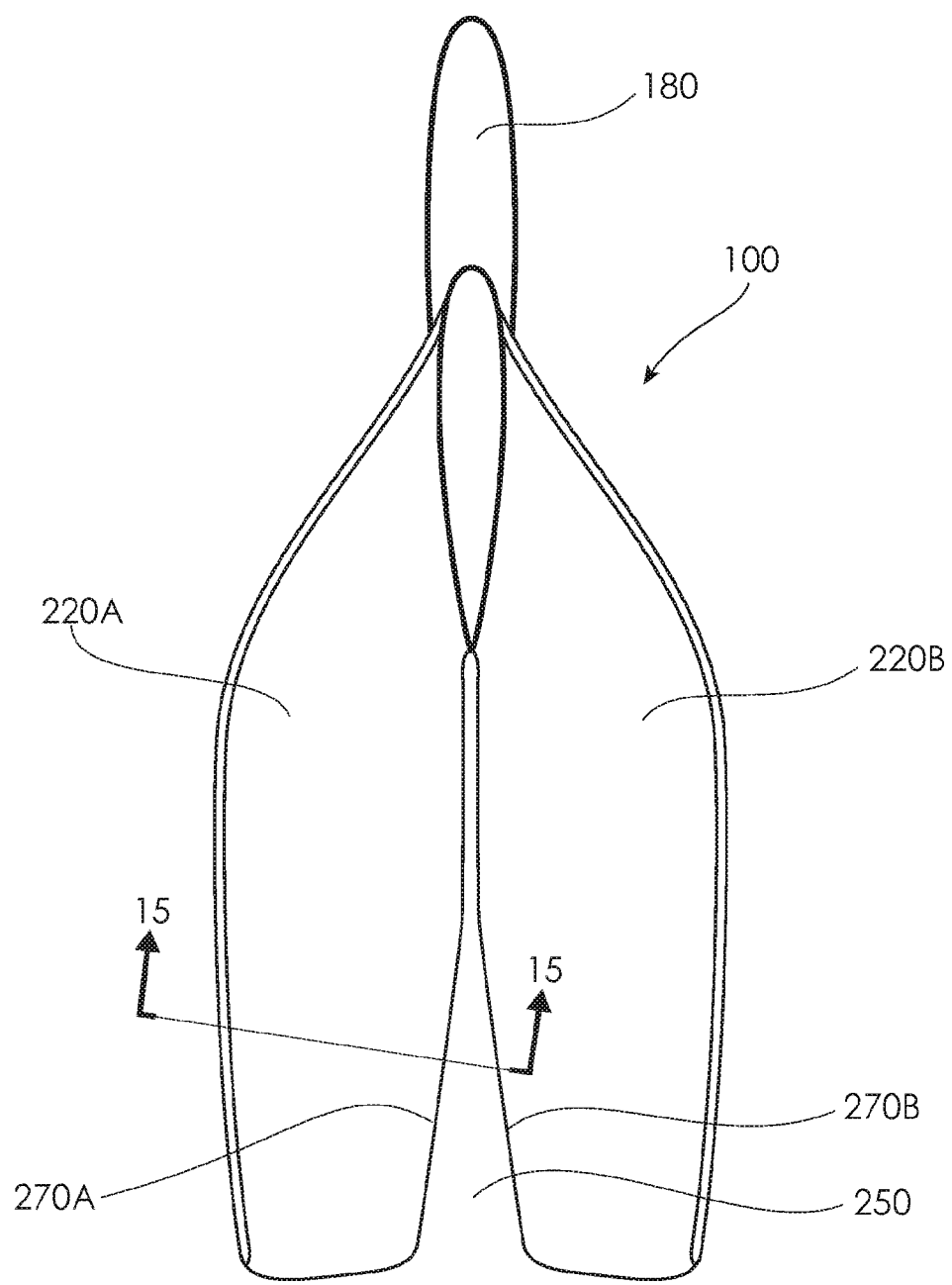
FIG. 14 is an underneath plan view of the underwater appendage assembly of the second embodiment.
Figure 15:
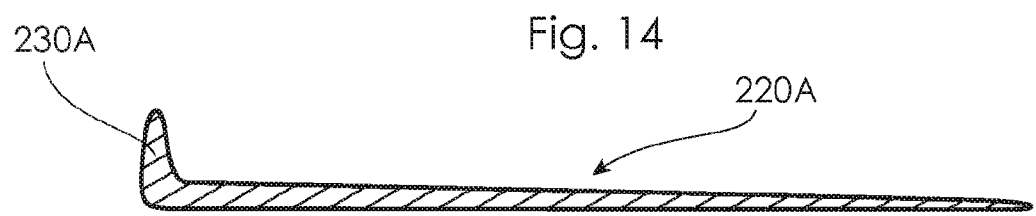
FIG. 15 is a sectional view of part of the underwater appendage assembly of the second embodiment taken from FIG. 14.
Figure 16:
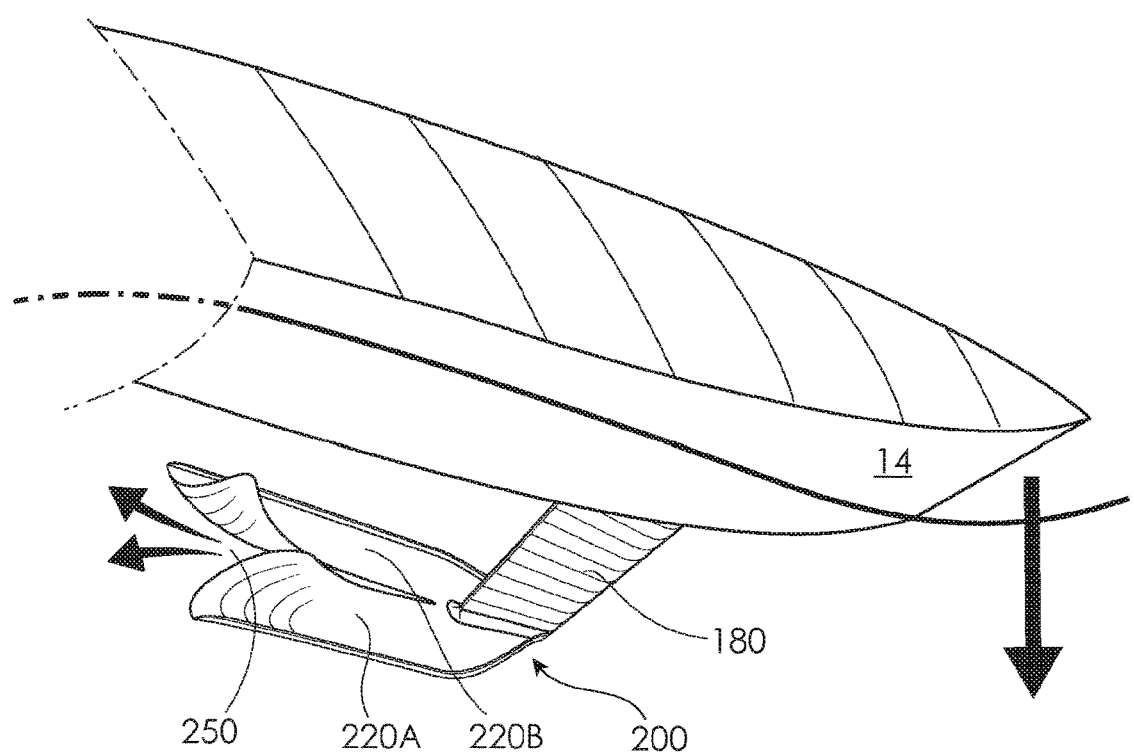
FIGS. 16 and 17 are schematic representations of the underwater appendage assembly of the second embodiment in operation under the influence of pitching of the marine vessel.
Figure 17:
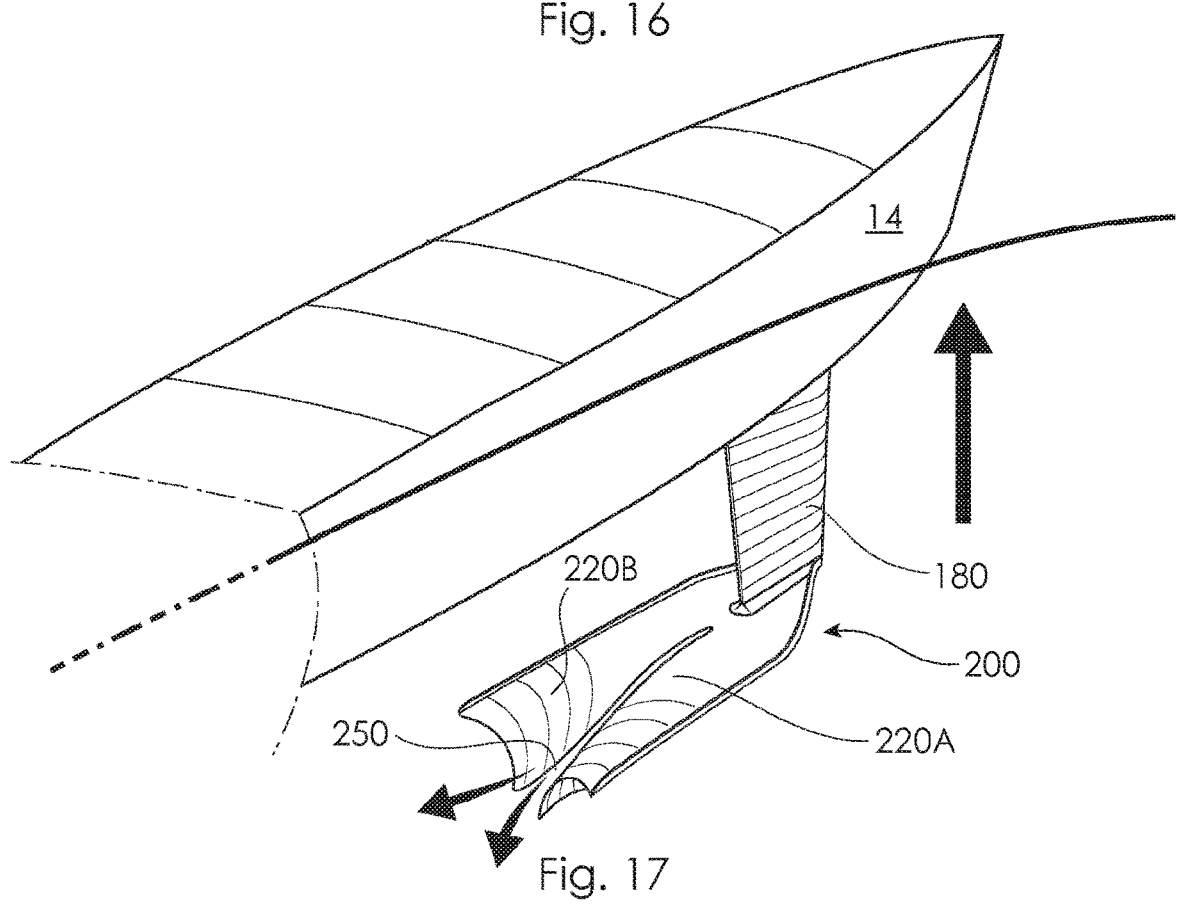
Figure 18:
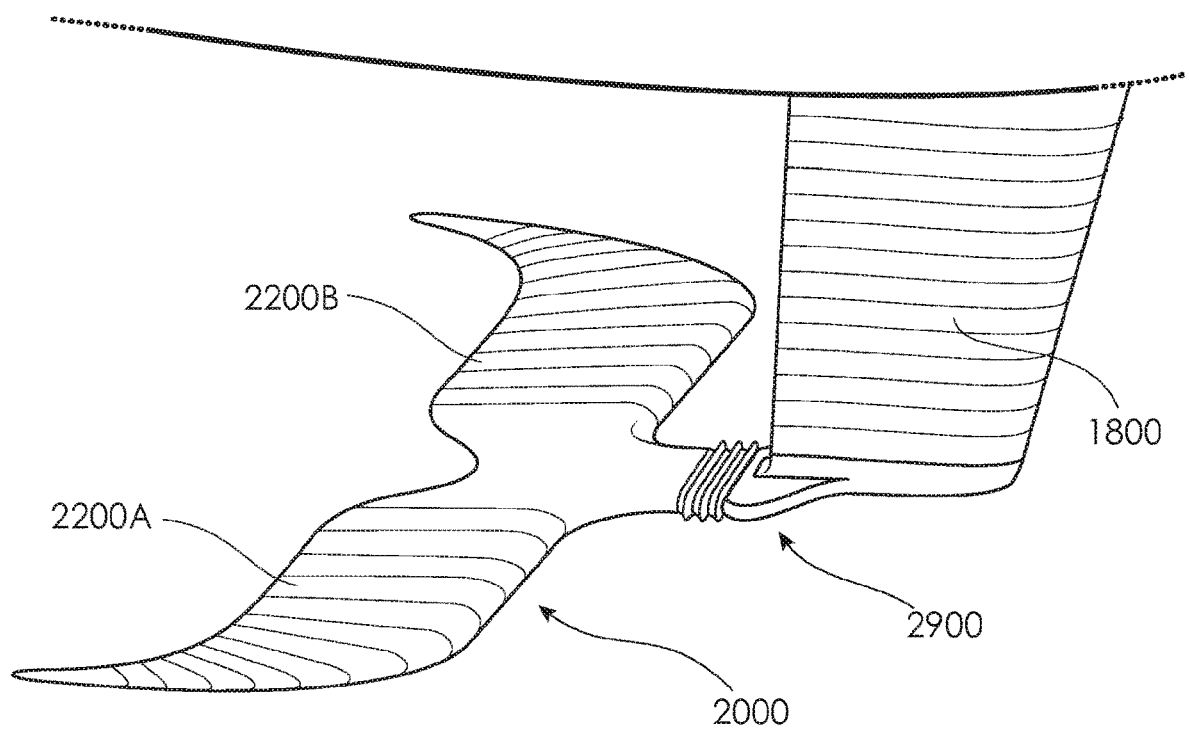
FIG. 18 is an upper perspective view of an underwater appendage assembly according to a third embodiment of the invention.
Figure 21:
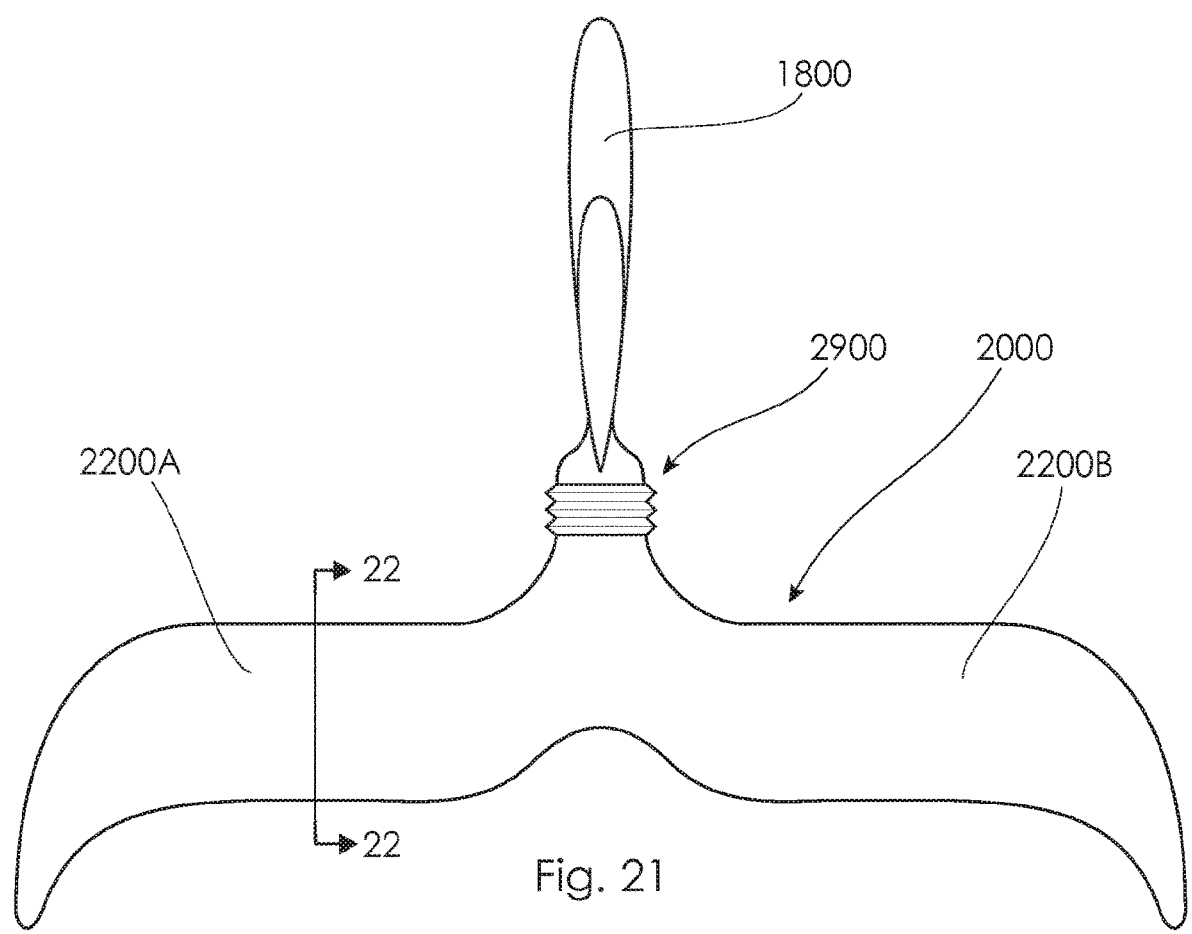
FIG. 21 is an underneath plan view of the underwater appendage assembly of the third embodiment.
Figure 22:
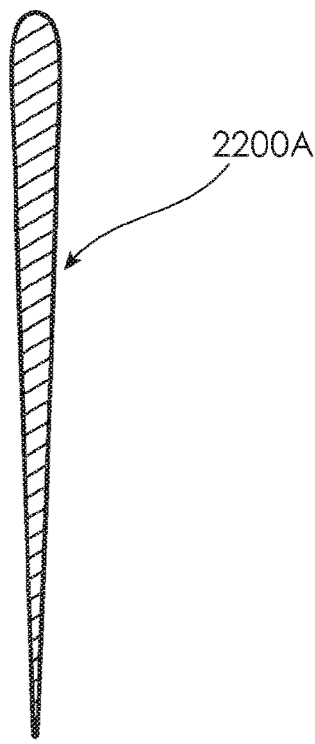
FIG. 22 is a sectional view of part of the underwater appendage assembly of the third embodiment taken from FIG. 21.

FIGS. 8 and 9 show pitching of the yacht 12 with its bow section 14 in a downward and upward trajectory, respectively. It can be seen that the downward motion induces an upward deflection 26 of the flapper member 20 and the upward motion induces a downward deflection 28 of the flapper member 20. This upward 26 and downward 28 deflection combines to provide the flapping action which is effective in promoting forward propulsion of the yacht 12.

The flapper member 20 of the first embodiment is constructed of a resiliently flexible material such as a rubber, polymeric, plastics, or composite material being a combination thereof. The flapper member 20 is moulded in one piece and connected integral with the rudder foil 18. This integral connection may include one or more fasteners (not shown) securing the flapper member 20 to the rudder foil 18. The flapper member 20 is thus rigidly connected to the rudder foil 18.

FIGS. 10 to 17 illustrate a second embodiment of an underwater appendage assembly 100 of an associated marine vessel 12. For ease of reference and in order to avoid repetition:

1. the underwater appendage assembly 100 of the second embodiment is fitted to the same marine vessel or yacht 12 of the first embodiment; and
2. corresponding components of the underwater appendage assembly 100 of the second embodiment are indicated with the same reference as the first embodiment but with an additional "0" suffix, for example the rudder foil is designated "180".

The pair of fins 220A/B of the flapper member 200 of this second embodiment are generally rectangular in their profile shape. Otherwise the generally rectangular-shaped fins 220A/B are each:

1. tapered in thickness inward in a cross-section generally transverse to the plane of the rudder foil 180;
2. include an elongate rib such as 230A along an outer edge and projecting in an upward direction.

As best shown in FIGS. 14 to 17 the pair of fins 220A/B are increasingly deflected in a rearward and inward direction. This increased deflection is caused by a combination of the elongate rib such as 230A stiffening the outer region of the fin such as 220A, and the fin 220A being tapered in its thickness inwardly. The pair of fins 220A/B define an intermediate space 250 between their opposing inward edges 270A and 270B respectively. The intermediate space 250 combines with the flapping action shown in FIGS. 16 and 17 to promote forward propulsion of the yacht 12.

FIGS. 18 to 24 depict a third embodiment of an underwater appendage assembly 1000 fitted to the same marine vessel 12 as the preceding embodiments, adopting the same numbering schedule or nomenclature. The underwater appendage assembly 1000 departs from the preceding embodiments insofar as:
1. the pair of fins 2200A/B resemble a dolphin's tail;
2. the flapper member 2000 is connected integral with the rudder foil 1800 via a flexible coupling 2900 fitted to a lower corner section of the rudder foil 1800;
3. the pair of fins such as 2200A are tapered with substantially flat surfaces in a rearward direction along a parallel cross-section.

Figure 23:
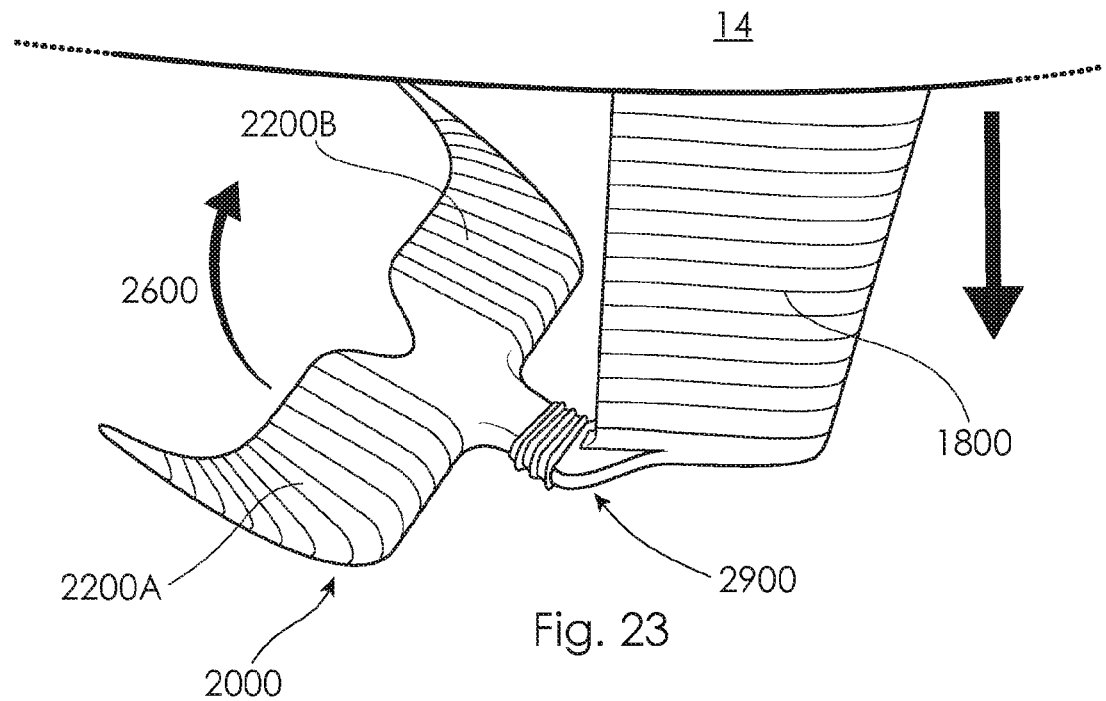
FIGS. 23 and 24 are schematic illustrations of the underwater appendage assembly of the third embodiment in operation under the influence of pitching of the marine vessel.
Figure 24:
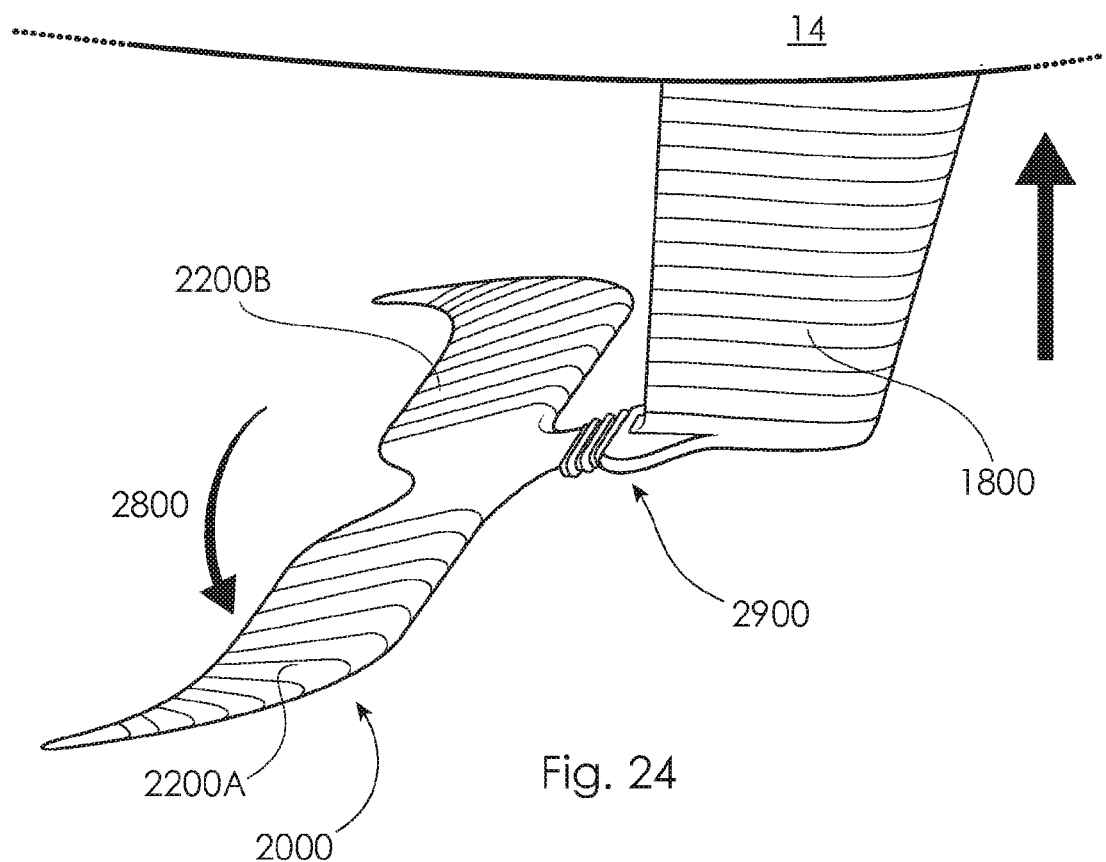

In this third embodiment the flexible coupling 2900 is elongate and in transverse cross-section shaped generally rectangular. The flexible coupling 2900 is connected integral with the rudder foil 1800 whereby the flapping action is in a substantially upward 2600 and downward 2800 direction as seen in FIGS. 23 and 24. It can be seen that the majority of the flapping action is provided by deflection of the flexible coupling 2900 without significant deflection of the fins 2200A/B. The fins 2200A/B may be constructed of a semi-rigid or rigid material wherein their tapered cross-sections are provided primarily for the purpose of flow efficiency and reduced turbulence.

Figure 25:
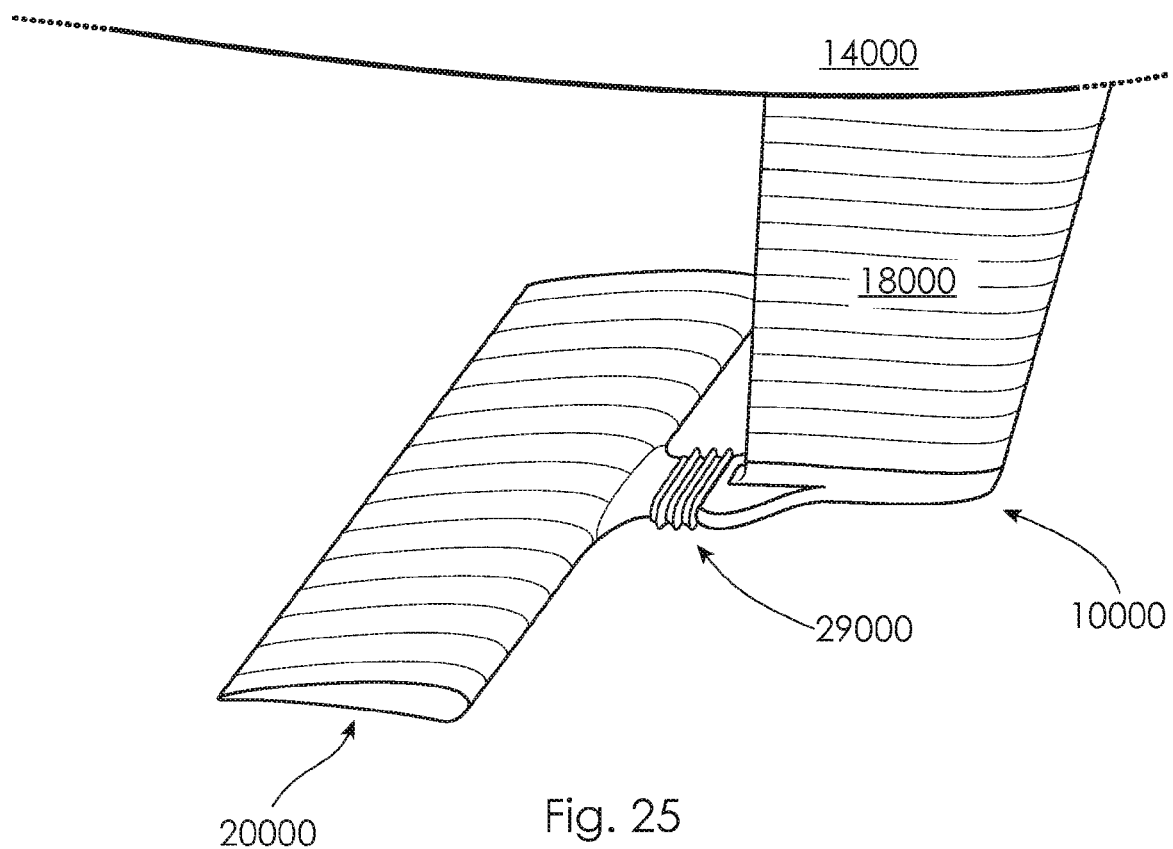
FIG. 25 is an upper perspective view of an underwater appendage assembly according to a fourth embodiment of the invention.

FIG. 25 shows a fourth embodiment of the underwater appendage assembly 10000 adopting the same nomenclature as the preceding embodiments. The fourth embodiment is based substantially on the third embodiment having the flexible coupling 29000 but in this instance connected to a flapper member 20000 shaped substantially rectangular in profile. The rectangular flapper member 20000 is again in cross-section shaped in the form of an aerofoil. The flapper member 20000 is in a similar manner to the third embodiment constructed of a rigid or semi-rigid material wherein the requisite flapping action is provided via the flexible coupling 29000.

Figure 26:
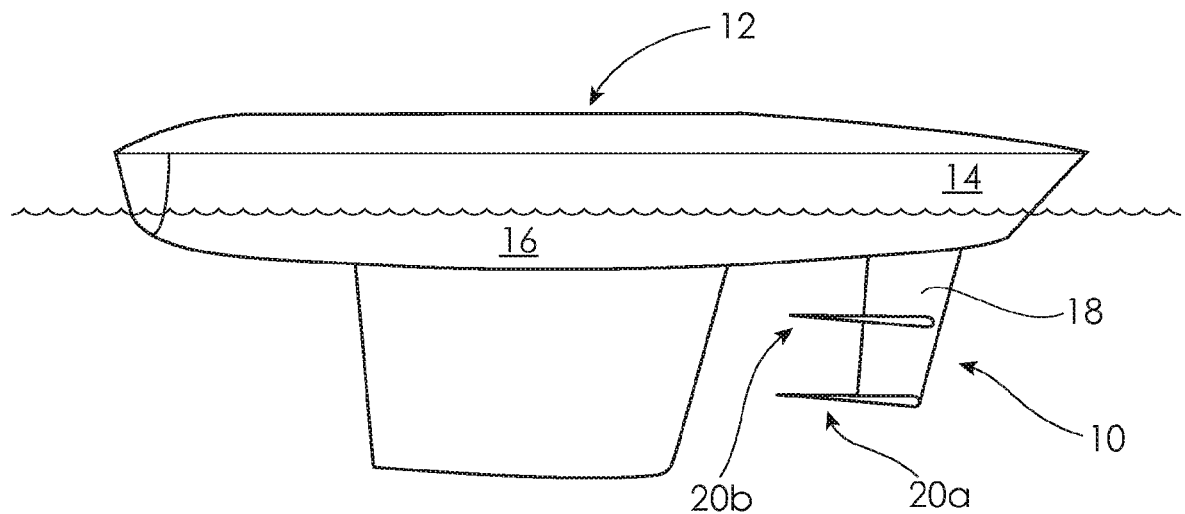
FIG. 26 is a side elevation of a marine vessel including an underwater appendage assembly of a fifth embodiment of the invention.
Figure 27:
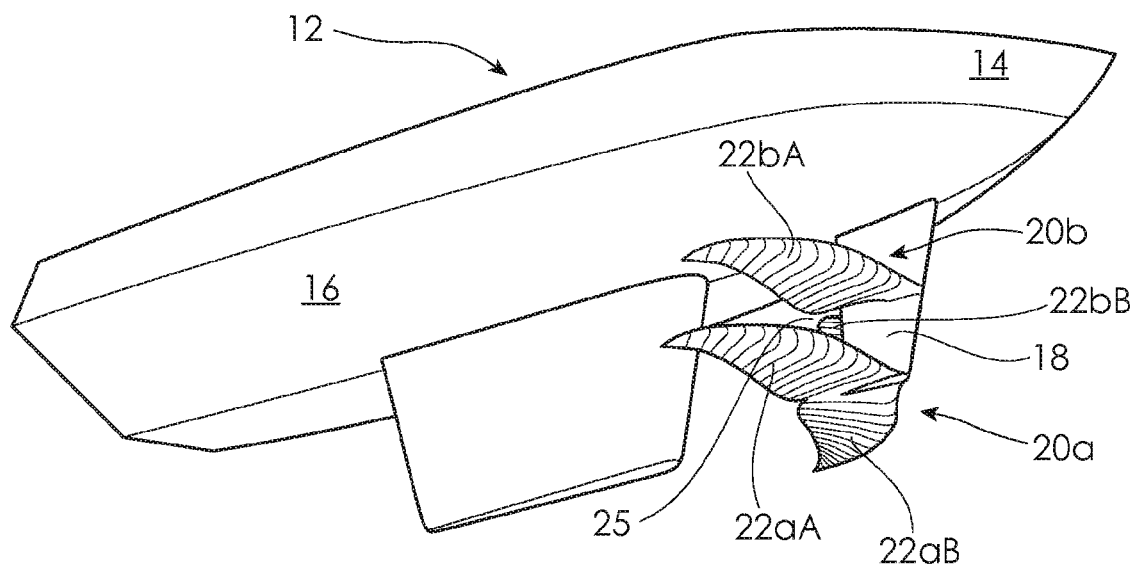
FIG. 27 is an underneath perspective view of the marine vessel including the underwater appendage assembly of the fifth embodiment.

FIGS. 26 and 27 illustrate a fifth embodiment of the underwater appendage assembly 10 of a similar configuration to the first embodiment but having a pair of flapper members 20a and 20b connected to or mounted integral with the rudder foil 18 one above the other. Because of the similarities between the first and fifth embodiments, the same reference numerals have been used for corresponding components. The lower flapper member 20a is substantially identical to the first embodiment with the pair of fins 22aA and 22aB. The upper flapper member 20b including its pair of fins 22bA and 22bB is connected integral with the rudder foil 18 about midway along its length. The upper flapper member 20b otherwise varies in its design insofar as:
1. the pair of fins 22bA and 22bB define an intermediate space 25 between their opposing inner edges extending around at least part of a trailing edge section of the rudder foil 18;
2. the pair of fins 22bA and 22bB are only mounted to or connected integral with the rudder foil 18 at its leading edge or front regions so that said fins deflect up and down in their flapping action either side of the intermediate space 25.

Figure 28:
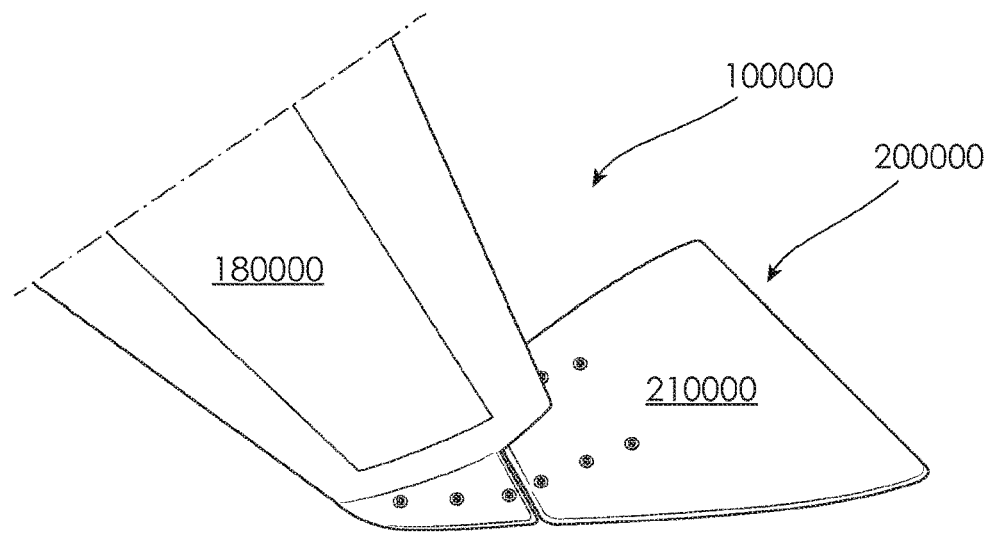
FIG. 28 is an upper perspective view of an underwater appendage assembly according to a sixth embodiment of the invention.
Figure 29:
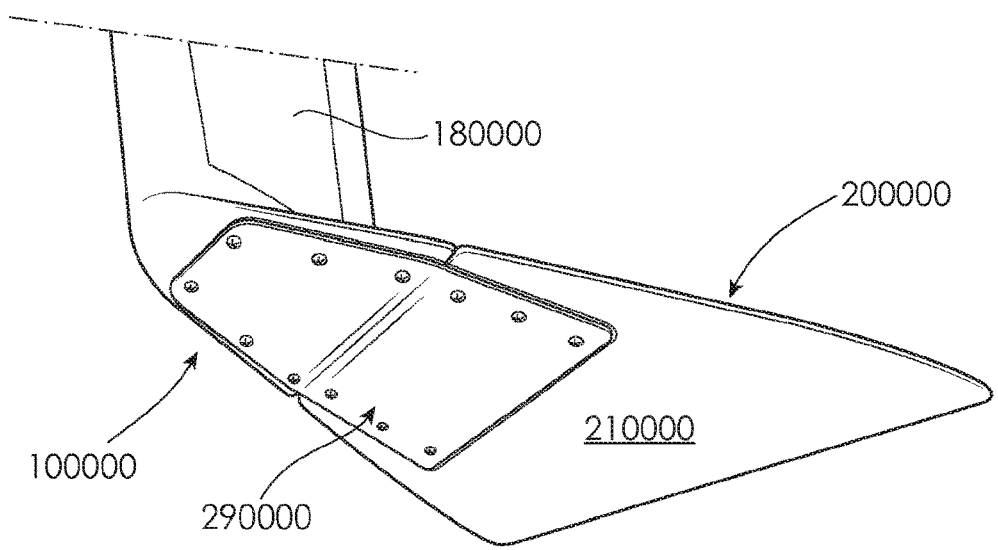
FIG. 29 is a lower perspective view of the underwater appendage assembly of the sixth embodiment.
Figure 30:
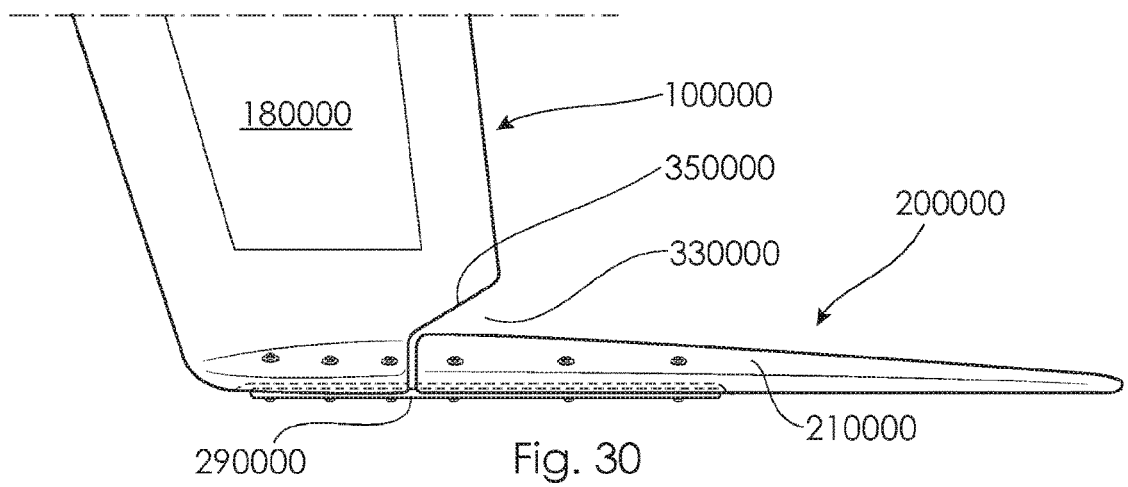
FIG. 30 is a side elevation of the underwater appendage assembly of the sixth embodiment.

FIGS. 28 to 30 illustrate a sixth embodiment of the underwater appendage assembly 100000 adopting the same nomenclature as the preceding embodiments. The flapper member 200000 includes a flexible coupling 290000 connected rigidly with the rudder foil 180000. The flexible coupling 29000 is in the form of a resiliently flexible plate constructed of a corrosion resistant material such as stainless steel. The flexible coupling 290000 is fastened to both an underside of:
1. a flapper blade 210000 which is in the form of a trapezium-shaped blade constructed of a rigid material such as the material from which the rudder foil 180000 is constructed;
2. an end plate 310000 formed at a base of the rudder foil 180000 and being generally triangular in shape.

It will be understood that the flexible coupling 290000 permits flapping of the flapper blade 210000 under the influence of the pitching motion of the associated yacht. As best seen in FIG. 30, the rudder foil 180000 includes a generally triangular-shaped cut out 330000 which provides an abutment surface 350000 which limits the upward movement of the flapper member 200000.

Figure 31:
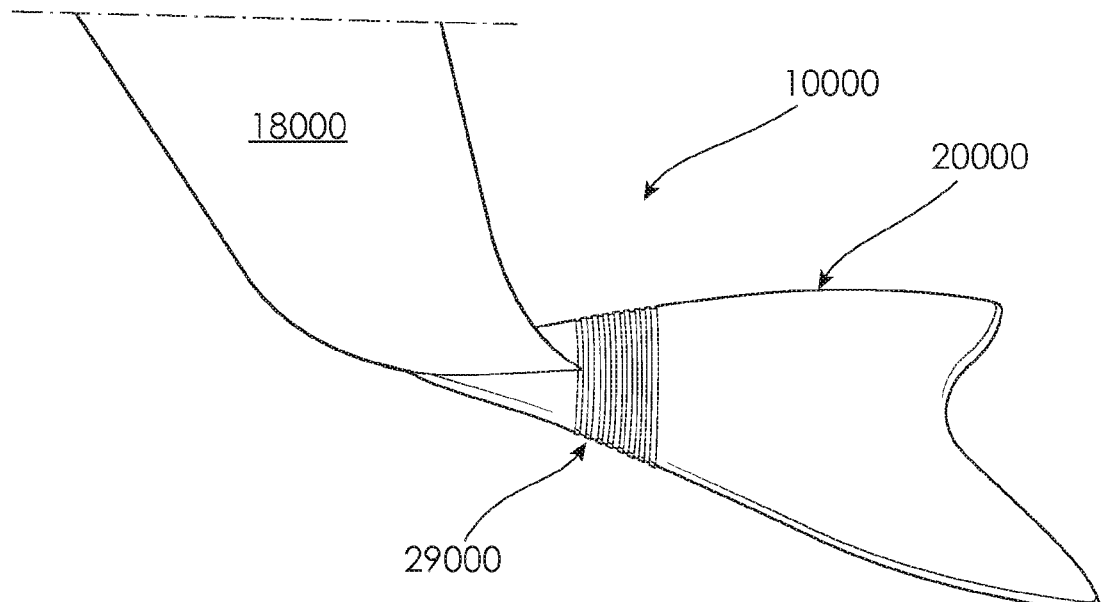
FIG. 31 is an upper perspective view of an underwater appendage assembly according to a seventh embodiment of the invention.
Figure 32:
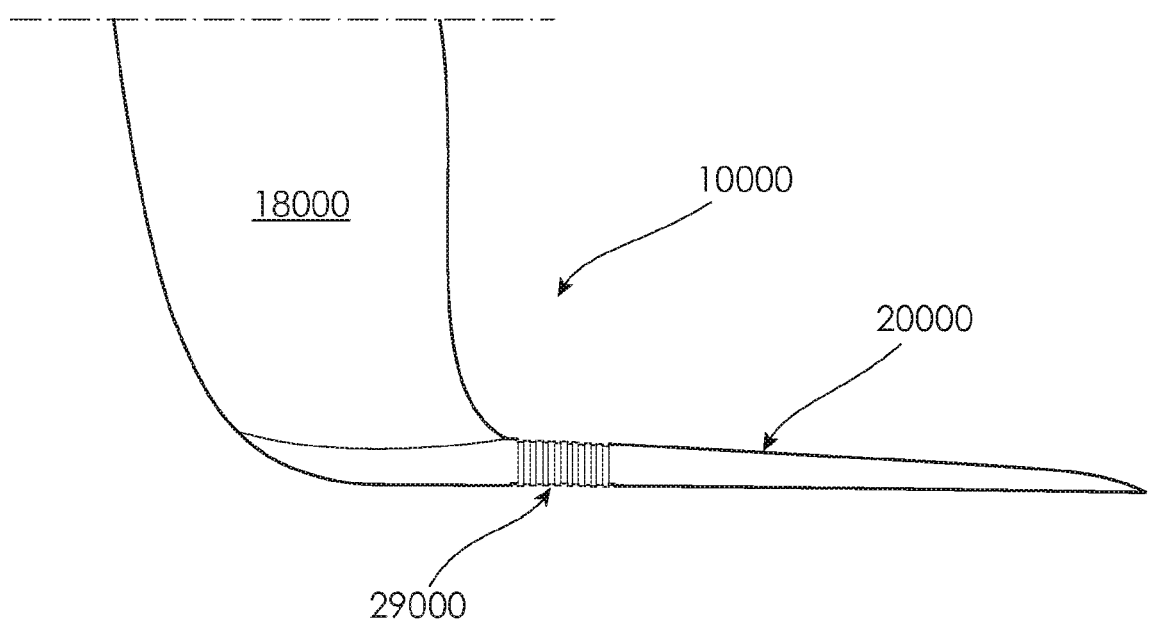
FIG. 32 is a side elevation of the underwater appendage assembly of the seventh embodiment.

FIGS. 31 and 32 illustrate a seventh embodiment of the underwater appendage assembly of a similar construction to the fourth embodiment. Because of the similarities between the fourth and seventh embodiments the same reference numerals have been used for corresponding components. The underwater appendage assembly 10000 of the seventh embodiment departs from the fourth embodiment in at least the following respects:
1. the flapper member 20000 is shaped in the form of a scuba flipper;
2. the flexible coupling 29000 is formed as a continuation of the flapper member 20000 so that the coupling 29000 together with the flapper member 20000 contribute to the flapping action.

Figure 33:
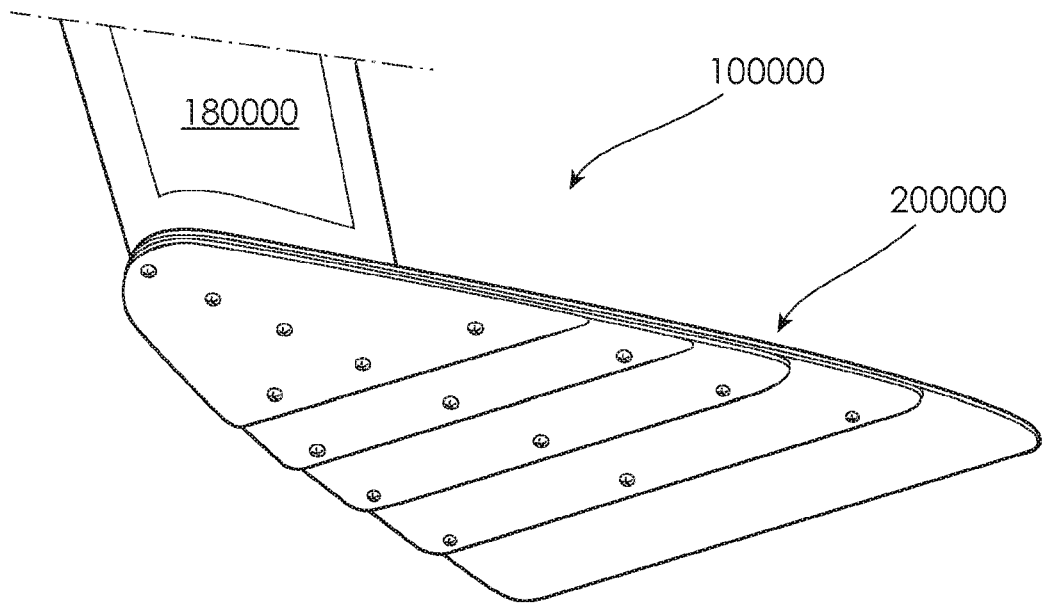
FIG. 33 is a lower perspective view of an underwater appendage assembly according to an eighth embodiment of the invention.
Figure 34:
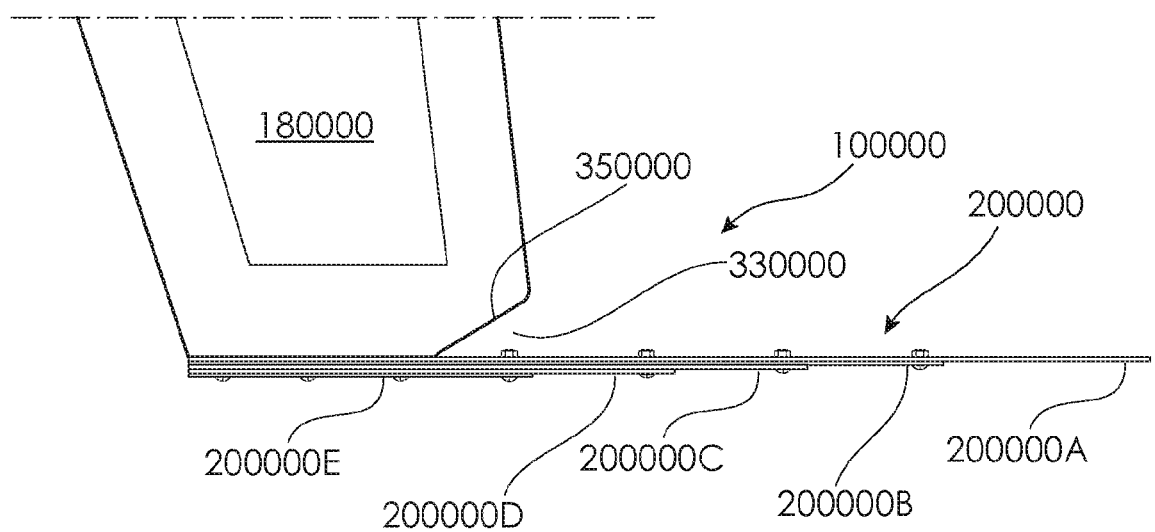
FIG. 34 is a side elevation of the underwater appendage assembly of the eighth embodiment.

FIGS. 33 and 34 illustrate an eighth embodiment of an underwater appendage assembly 100000 of a similar configuration to the sixth embodiment. For this reason the same reference numerals are used for the corresponding components. In this variation the flapper member 200000 is constructed from a series of layered plates 20000A to 20000E fastened to one another and together mounted to a base of the rudder foil 180000. The plates such as 200000A are generally triangular in their profile shape and are increasingly smaller in their profile shape from the uppermost to the lowermost 200000A to 200000E plates. Each of the plates such as 200000A is constructed of a resiliently flexible material such as stainless steel so that together they provide the required flapping action in promoting propulsion of the associated marine vessel.

Now that several embodiments of the underwater appendage assembly of a marine vessel have been described it will be apparent to those skilled in the art that there are the following advantages:
1. the underwater appendage assembly includes no or minimal moving parts thus reducing noise and the likelihood of mechanical breakage;
2. fitting the flapper member to a rudder foil or other appendage located at or proximal the bow of the marine vessel harnesses the increased pitching action at this region of the vessel;

3. constructing the flapper member of a resiliently flexible material means its deflection can be designed to optimise propulsion of the associated marine vessel;
4. if the flapper member is separated in the form of a pair of fins they can act independently in rolling seas to assist in propelling the rolling vessel forward;
5. in the embodiments where the underwater appendage assembly is in the form of a rudder assembly:
   a. steerage of the vessel is improved by including the flapper member on a bow rudder assembly;
   b. it can effectively act as a sea anchor with the vessel pitching up and down whereby the rudder assembly allows the vessel to passively hold station.

Those skilled in the art will appreciate that the invention described herein is susceptible to variations and modifications other than those specifically described. For example, the flapper member may vary in its profile and sectional shapes provided there is a flapping action induced under the influence of pitching of the vessel. The flapper member may be connected to or mounted integral with an appendage other than the rudder foil. For example, the flapper member may be mounted to the keel of the marine vessel or alternatively a fixed canard forward of the keel. The material from which the flapper member is constructed may vary where for example relatively light and flexible metals such as aluminium may be suited. The flapper member may include additional design features such as channels or ridges arranged to promote flow across the flapper member improving its efficiency in propelling the associated vessel. All such variations and modifications are to be considered with the scope of the present invention the nature of which is to be determined from the foregoing description.

The invention claimed is:

1. An underwater appendage assembly of a marine vessel, said assembly comprising:
   an underwater appendage adapted to mount to a hull of the marine vessel proximal to a bow of said vessel, said appendage being a rudder foil mounted to the hull about a rotational axis; and
   a flapper member connected to the rudder foil in a substantially horizontal plane substantially perpendicular to the rudder foil, the flapper member arranged whereby movement of the marine vessel induces a deflection of the flapper member relative to the rudder foil in a flapping action effective in promoting forward propulsion of the marine vessel.

2. An underwater appendage assembly as claimed in claim 1, wherein the flapper member is at least in part constructed of a resiliently flexible material whereby pitching of the vessel effects the deflection of the resiliently flexible part of the flapper material.

3. An underwater appendage assembly as claimed in claim 1 wherein the flapper member is in the form of a pair of fins connected to and disposed on either side of the appendage, respectively.

4. An underwater appendage assembly as claimed in claim 3 wherein the pair of fins are in profile generally wing-shaped and integrally mounted to the appendage, the wing-shaped fins in cross-section generally parallel to the plane of the appendage tapered in thickness.

5. An underwater appendage assembly as claimed in claim 4 wherein the pair of fins are tapered in a rearward direction along the parallel cross-section.

6. An underwater appendage assembly as claimed in claim 4 wherein the wing-shaped pair of fins are also in cross-section generally transverse or diagonal to the plane of the appendage tapered in thickness.

7. An underwater appendage assembly as claimed in claim 6 wherein the pair of fins are tapered in an inward direction along the transverse or diagonal cross-section.

8. An underwater appendage assembly as claimed in claim 4 wherein the pair of fins define an intermediate space between at least part of their respective trailing edges and rearward of the appendage, the intermediate space designed to promote additional forward propulsion of the vessel.

9. An underwater appendage assembly as claimed in claim 4 wherein the pair of fins each include an elongate rib along at least a part of their outer edges.

10. An underwater appendage assembly as claimed in claim 9 wherein the elongate rib is in the form of a wing tip.

11. An underwater appendage assembly as claimed in claim 1 wherein the flapper member includes a flexible coupling connected to a rigid or semi rigid flapper blade, the flexible coupling secured rigidly to the appendage and designed to be deflected to provide the flapping action predominantly in the flapper blade.

12. An underwater appendage assembly as claimed in claim 11 wherein the flexible coupling is formed integral with the flapper blade.

13. An underwater appendage assembly as claimed in claim 1 wherein the flapper member is one of a plurality of flapper members spaced vertically along the appendage.

14. An underwater appendage assembly as claimed in claim 13 wherein a lowermost of the vertically spaced flapper members mounts at an end of the appendage to assist in providing an endplate effect.

15. An underwater appendage assembly as claimed in claim 1 wherein the flapper member is molded in one piece.

16. An underwater appendage assembly as claimed in claim 1 wherein the flapper member is one of a plurality of flapper members at least partly secured to one another in a layered configuration.

17. An underwater appendage assembly as claimed in claim 1, wherein the rotational axis is oriented in a generally vertical direction with respect to the hull.

18. An underwater appendage assembly as claimed in claim 1, wherein rotation of the rudder foil about the rotational axis alters the direction of travel of the marine vessel.

* * * * *